United States Patent

Hall

[19]

[11] Patent Number: 6,034,506
[45] Date of Patent: *Mar. 7, 2000

[54] LITHIUM ION SATELLITE BATTERY CHARGE CONTROL CIRCUIT

[75] Inventor: John C. Hall, Saratoga, Calif.

[73] Assignee: Space Systems/Loral, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/008,237

[22] Filed: Jan. 16, 1998

[51] Int. Cl.$^7$ ............................................. H02J 7/00
[52] U.S. Cl. ........................... 320/117; 320/101; 320/122
[58] Field of Search .................... 320/117, 122, 320/101

[56] References Cited

U.S. PATENT DOCUMENTS

| | | | |
|---|---|---|---|
| 4,297,629 | 10/1981 | Godard et al. | 320/117 |
| 5,744,936 | 4/1998 | Kawakami | 320/120 |
| 5,811,959 | 9/1998 | Kejha | 320/126 |
| 5,850,136 | 12/1998 | Kaneko | 320/119 |
| 5,909,103 | 6/1999 | Williams | 320/134 |
| 5,920,181 | 7/1999 | Alberkrack et al. | 320/146 |

*Primary Examiner*—Edward H. Tso
*Assistant Examiner*—Gregory J. Toatley, Jr.
*Attorney, Agent, or Firm*—Kenneth W. Float

[57] ABSTRACT

A charge control circuit for use with lithium ion satellite batteries that provides for both charge control and cell bypass features. The charge control circuit reconfigures the battery from a series array of cells to a parallel array of cells using switches (that are part of the battery) in order to implement the cell bypass function. The switches are preferably implemented using low resistance mechanical relays to lessen the thermal dissipation of the circuit. The charge control circuit minimizes the amount of current passing through the parallel battery circuit by breaking the battery down into sub-modules for purposes of charging, and using distributed low voltage power supplies for charging. The charge control circuit may also implement sequential charging of the battery along with bus cross strapping to ensure that the satellite electrical bus is always supported by one battery during battery recharging.

8 Claims, 2 Drawing Sheets

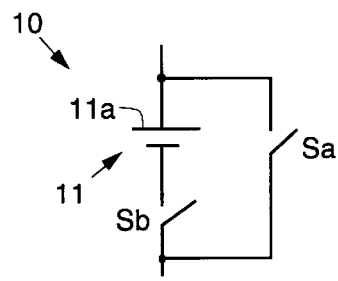
Fig. 1
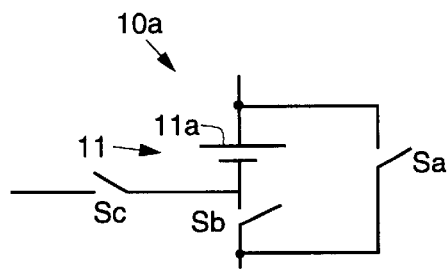
Fig. 2
Fig. 4
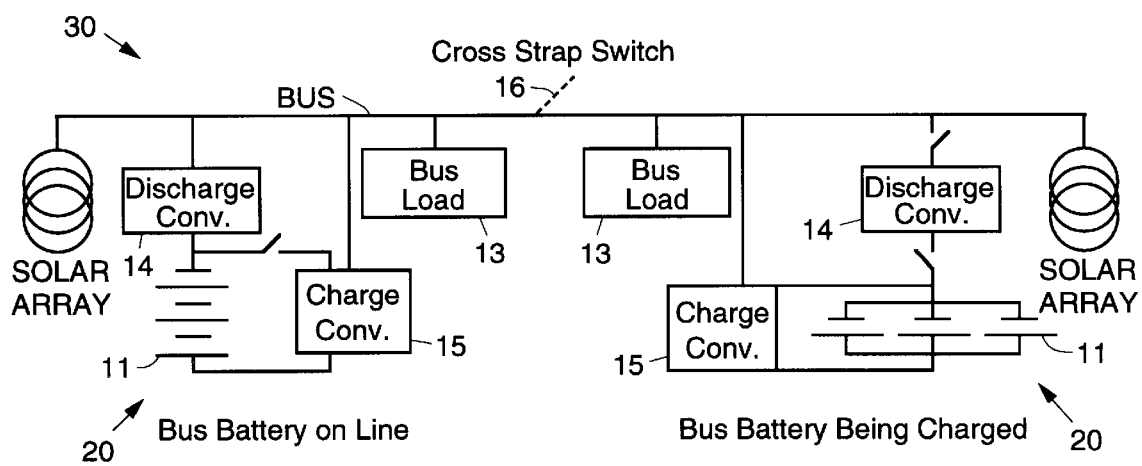

LITHIUM ION SATELLITE BATTERY CHARGE CONTROL CIRCUIT

BACKGROUND

The present invention relates generally to non-aqueous batteries and specifically to lithium ion satellite batteries, and more particularly, to a charge control circuit for use with lithium ion satellite batteries.

Lithium ion batteries have unique characteristics that greatly impact charge/discharge control. Unlike nickel cadmium and nickel hydrogen cells, lithium ion cells cannot be over charged or discharged without irreversible damage. The key charge control issues for lithium ion batteries are the following.

The first issue is that each battery cell must have independent maximum over-voltage control during charging (typically at 4.1 V to 4.2 V depending on temperature, aging, etc.). The second issue is that battery cells should have independent undervoltage control during discharging (typically 3.0 V). The third issue is that there must be a means of bypassing a cell that has failed open or is demonstrating anomalous behavior. Furthermore, a fourth issues is that a modular, expandable, system is highly desirable and beneficial.

Commercial batteries generally only address the first issue and a variety of charge control methodologies have been proposed. However, with one exception these methods employ active bypass circuitry that generates substantial waste heat as current which is shunted past cells that have reached a full state of charge.

Accordingly, it is an objective of the present invention to provide for an improved charge control circuit for use with lithium ion satellite batteries that overcomes the limitations of conventional charge control circuits.

SUMMARY OF THE INVENTION

To accomplish the above and other objectives, the present invention comprises a charge control circuit that provides for distributed charging power supplies combined with parallel charging that implement fault tolerant charging, and combined cell bypass and charge control of lithium ion satellite batteries.

The charge control circuit reconfigures the battery from a series array of cells to a parallel array of cells using switches to implement the cell bypass function. The charge control circuit minimizes the amount of current passing through the parallel battery circuit by breaking the battery down into sub-modules for purposes of charging, and using distributed low voltage power supplies for charging.

More specifically, in one specific implementation, the lithium ion battery charge control circuit comprises a lithium ion battery having a plurality of sub-modules each containing a plurality of battery cells. A plurality of switches reconfigure the sub-module from a series array of cells (discharge mode) to a parallel array of cells (charge mode). A DC to DC power supply having first and second terminals is coupled to the battery cells of each of the sub-modules.

Thus, the present invention provides for the bifunctional use of bypass switches to bypass faults in the battery cells and also to provide for reconfiguration of the battery cells to permit battery charging. Furthermore, the present invention provides for parallel charging of cells in sub-modules along with the use of multiple distributed power supplies to reduce current and bus power requirements.

The charge control circuit may also implement sequential charging of two batteries along with bus cross strapping to ensure that the satellite electrical bus is always supported by one battery during battery recharging. The cross strap satellite bus circuit prevents failure during parallel taper charging of the lithium ion batteries. The cross strap circuit has one battery coupled to the satellite electrical bus while the other battery bus is being charged.

The charge control circuit has lower mass and thermal dissipation than alternative approaches. The charge control circuit enables parallel charging of lithium ion spacecraft batteries, which is the lowest risk approach that provides for charge control of such batteries. The present charge control circuit enables safe, mass efficient, and low thermal dissipation charging of lithium ion spacecraft batteries.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 illustrates a simple circuit for providing bypass of anomalous cells;

FIG. 2 illustrates a simple circuit for implementing parallel charging; and

FIG. 4 illustrates a cross strap satellite bus circuit that prevents failure during parallel charging of lithium ion batteries.

DETAILED DESCRIPTION

Figure 3:
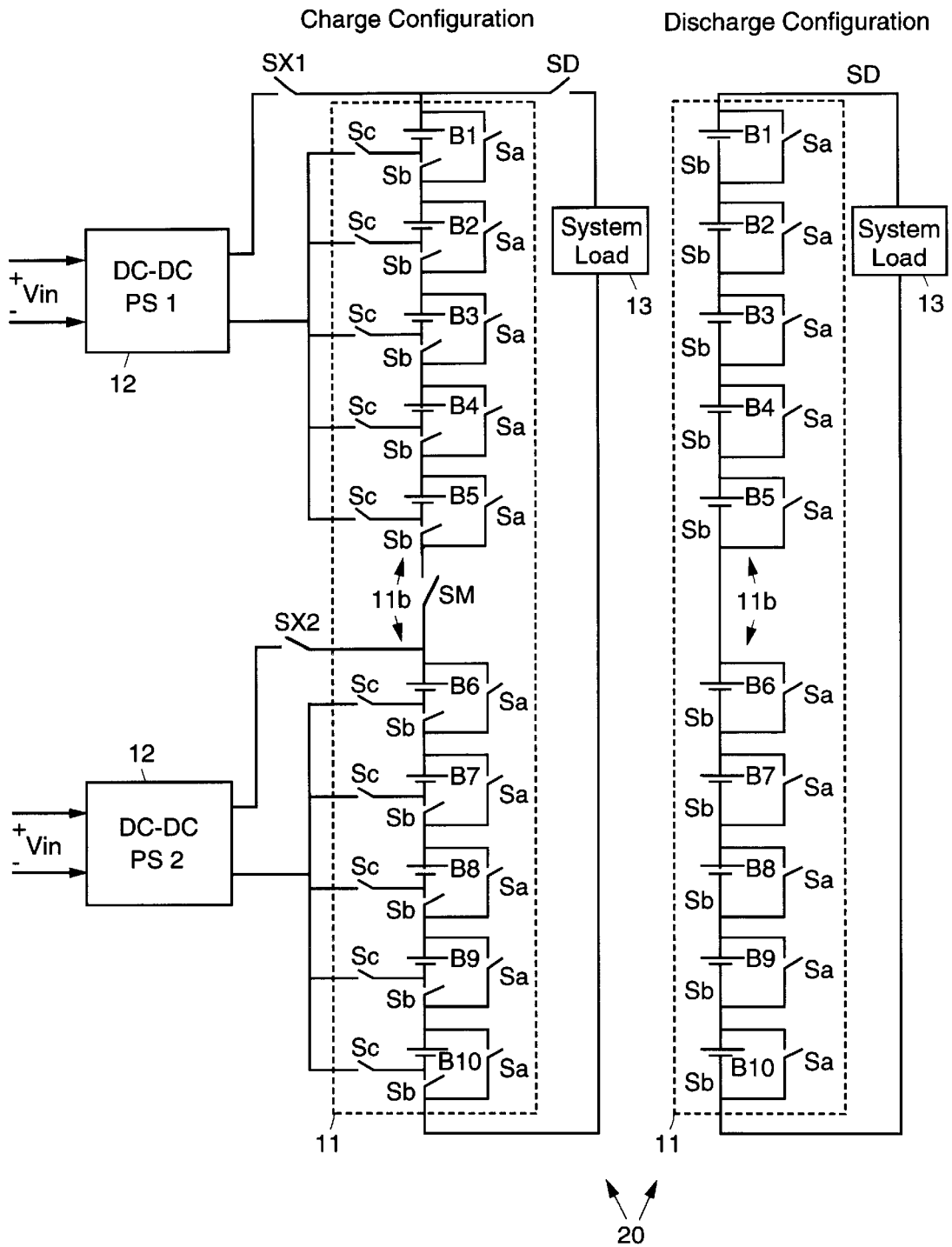
FIG. 3 illustrates a ten cell battery configuration implemented in a preferred embodiment of a charge control circuit in accordance with the principles of the present invention.

Referring to the drawing figures, the present invention provides for a charge control circuit 20 (detailed in FIG. 3) for use with lithium ion satellite batteries 11 that provides for safe, mass efficient, and low thermal dissipation charging of such batteries 11. The present invention overcomes the disadvantages of conventional lithium ion satellite battery charging approaches and addresses the issues outlined above in the Background section.

The only means of resolving issues 2 and 3 mentioned in the Background section is to include a switching function in series and in parallel with each cell 11a of the battery 11 as shown in FIG. 1. In particular, FIG. 1 illustrates a simple circuit 10 for providing bypass of anomalous cells 11a of a battery 11 that prevents over discharging of the cells 11a. A first switch, Sa, is in parallel with the cell 11a and a second switch, Sb, is in series with the cell 11a.

The second switch, Sb, is normally closed. During discharge, if the voltage of the cell 11a drops below 3 V, the second switch, Sb, must be opened. The first switch, Sa, is normally open. If an open cell 11a is detected, the first switch, Sa, must be closed. This is a key design driver in developing the present charge control circuit 20.

Charge control schemes include parallel/taper charging, series charging/cell shunting, resistive equalization, and transformer equalization. Parallel/taper charge control schemes have the following critical advantages when compared with the alternative approaches. A single power supply can charge all cells 11a to a fixed voltage. Since each cell 11a is guaranteed to be charged to the same voltage, there is an inherent self-balancing, high reliability feature with this technique.

Parallel charging, when properly engineered generates a minimum of waste heat since there is no shunting of excess charge current. Parallel charging intrinsically and uniquely accommodates the required cell bypass switching. In other words parallel charging minimizes required additional hardware.

The cell bypass relay configuration shown in FIG. 1 may be easily modified in order to achieve a parallel taper charging circuit 10a by the addition of a third switch, Sc, as shown in FIG. 2. During charging, the first switch, Sa, is closed, the second switch Sb is open, and the third switch Sc is closed.

Issues with this circuit 10a are the high currents that are required to parallel charge an entire battery 11, which in turn impacts bus bar and switch power design; the requirement for high power, low resistance switching; and fault protection in the event of a switch failure and vehicle (satellite) failure in the event of a bus fault while the reconfigured parallel battery 11 is off-line and is being charged.

With regard to the high current requirements, the approach to the first issue provided by the present invention is to further reconfigure the battery 11 during charging to have multi-cell (five-cell, for example) sub-modules 11b, each of which are charged in parallel, as is shown in FIG. 3. More specifically, FIG. 3 illustrates a ten cell battery 11 implemented in a preferred embodiment of a charge control circuit 20 in accordance with the principles of the present invention.

The circuit 20 shown in FIG. 3 is comprised of two DC to DC power supplies 12 that are respectively coupled to the five-cell sub-modules 11b of the battery 11. The respective five-cell sub-modules 11b have five cells 11a coupled in series. The two five-cell sub-modules 11b are coupled together by means of a fourth switch, SM. The two DC to DC power supplies 12 have their respective positive terminals coupled by way of fifth switches, SX1, SX2, to positive electrodes of the respective five-cell sub-modules 11b. The battery 11 is coupled through a sixth switch, SD, to a system load 13.

During charging mode, shown on the left side of FIG. 3, each of the first switches, Sa, are closed, each of the second switches, Sb, are open, and each of the third switches, Sc, are closed. The fifth switches, SX1, SX2 are closed, and the fourth and sixth switches, SM, SD, are open. During discharge mode, shown on the right side of FIG. 3, each of the first switches Sa are open, each of the first switches Sb are closed, and each of the first switches Sc are open. The fourth and sixth switches, SM, SD, are closed, and the fifth switches, SX1, SX2, are open. The modular approach implemented by the present invention eliminates possible switch and bus bar over-design due to high current parallel charging of the battery circuit 20.

With regard to the issue of high current switches, there are two possibilities: the first is the use of a mechanical relay, and the second is the use of a MOSFET switch. The mechanical switch is required for high current operation. The mechanical relay may be used for the spacecraft battery cell bypass function implemented by the first switches, Sa. The use of such low voltage MOSFETs represents an acceptable solution for smaller batteries 11, however, heat generation for larger batteries 11 is unacceptable.

There are several potential failure modes that are addressed by the present invention. For example, all of the charge current flows through the first switches, Sa. A redundant switch in parallel with each of the first switches, Sa, may be used to solve this potential problem. A short circuit on one of the second switches, Sb, could cause all cells 11a to be short-circuited during charging. Again a redundant switch in series with each of the second switches, Sb, may be used to solve this problem.

A second critical failure mode is a bus fault during charging. A solar array is a current source, as opposed to a voltage source, and thus is unable to clear bus faults (voltage drops to zero) unless the battery 11 is connected in parallel with it. This issue may be addressed by (a) engineering sufficient capacitance into the bus to allow reconfiguration of the battery 11 to the discharge mode (~1 millisecond), (b) use of a two-battery architecture with bus cross strapping and sequential charging (see FIG. 4 for an example of such a circuit 30), and/or (c) use of a small backup battery (not shown) to preserve volatile memory and operate battery reconfiguration relays.

Referring now to FIG. 4, it illustrates a cross strap satellite bus circuit 30 that prevents failure during parallel taper charging of lithium ion batteries 11. The cross strap satellite bus circuit 30 has one battery 11 coupled to the satellite electrical bus while the other battery 11 bus is being charged. Bus cross strapping uses a cross strap switch 16 to ensure that the satellite electrical bus is always supported by one battery 11 during battery recharge. Each of the two charging circuits 20 are selectively configured to have the appropriate charge configuration or discharge configuration shown in FIG. 3, as required. The circuit 30 shown in FIG. 4 also employs discharge and charge converters 14, 15 which are used in satellites manufactured by the assignee of the present invention. The discharge and charge converters 14, 15 are not pertinent to the present invention.

Thus, the present invention provides for a charge control circuit 20 for use with lithium ion satellite batteries 11 that provides for both charge control and cell bypass features. This improved charge control circuit 20 is achieved by reconfiguring the battery 11 from a series array of cells 11a to a parallel array of cells 11a by use of switches (that are already built into the battery) in order to implement the cell bypass function. The switches may be preferably implemented using low resistance mechanical relays instead of MOSFET relays, which lessens the thermal dissipation of the circuit.

The charge control circuit 20 minimizes the amount of current that passes through the parallel battery charge control circuit 20 by breaking the battery 11 down into sub-modules 11b for purposes of charging, and using distributed low voltage power supplies for charging. The charge control circuit 20 may also be configured to implement sequential charging of the battery 11 combined with bus cross strapping to ensure that the satellite electrical bus is always supported by one battery 11 during battery recharging.

Thus, an improved charge control circuit for use with lithium ion satellite batteries has been disclosed. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. Lithium ion battery charging apparatus comprising:
   a lithium ion battery comprising a plurality of sub-modules each containing a plurality of battery cells; and
   a charge control circuit that comprises:
      a plurality of first switches for connecting the battery cells of the plurality of sub-modules in parallel;
      a plurality of second switches for connecting the respective battery cells of each of the plurality of sub-modules in series;
      a DC to DC power supply having first and second terminals coupled to the battery cells of each of the sub-modules;
      a plurality of third switches respectively coupled between the plurality of battery cells of each sub-module and the first terminal the respective DC to DC power supply;
      a fourth switch coupled between the respective sub-modules;
      a fifth switch respectively coupled between the second terminal of each respective DC to DC power supply and the respective sub-module; and
      a sixth switch serially coupled between the charge control circuit and a load.

2. The apparatus of claim 1 which further comprises:
   a second lithium ion battery comprising a plurality of sub-modules each containing a plurality of battery cells;
   a second charge control circuit that each comprises:
      a plurality of first switches for connecting the battery cells of the plurality of sub-modules in parallel;
      a plurality of second switches for connecting the respective battery cells of each of the plurality of sub-modules in series;
      a DC to DC power supply having first and second terminals coupled to the battery cells of each of the sub-modules;
      a plurality of third switches respectively coupled between the plurality of battery cells of each sub-module and the first terminal the respective DC to DC power supply;
      a fourth switch coupled between the respective sub-modules;
      a fifth switch respectively coupled between the second terminal of each respective DC to DC power supply and the respective sub-module; and
      a sixth switch serially coupled between the charge control circuit and a load; and
   a cross strap switch coupled between the first and second charge control circuits.

3. Lithium ion battery charging apparatus comprising:
   first and second lithium ion batteries comprising a plurality of sub-modules each containing a plurality of battery cells, and wherein the respective batteries are selectively coupled to a load;
   first and second charge control circuits that each comprise:
      a plurality of first switches for connecting the battery cells of the plurality of sub-modules in parallel;
      a plurality of second switches for connecting the respective battery cells of each of the plurality of sub-modules in series;
      a DC to DC power supply having first and second terminals coupled to the battery cells of each of the sub-modules;
      a plurality of third switches respectively coupled between the plurality of battery cells of each sub-module and the first terminal the respective DC to DC power supply;
      a fourth switch coupled between the respective sub-modules;
      a fifth switch respectively coupled between the second terminal of each respective DC to DC power supply and the respective sub-module; and
      a sixth switch serially coupled between the charge control circuit and a load; and
   a cross strap switch coupled between the charge control circuits to selectively couple the first and second batteries to the load.

4. Non-aqueous battery charging apparatus for use in a satellite, comprising:
   a non-aqueous battery disposect in a satellite comprising a plurality of sub-modules each containing a plurality of battery cells; and
   a charge control circuit that comprises:
      charging means for charging each of the cells of the plurality of sub-modules of the non-aqueous battery; and
      cell bypass means including a plurality of first switches (Sa) for bypassing battery cells that are faulty, and pluralities of second and third switches (Sb, Sc) for reconfiguring the cells of the battery from a series array of cells to a parallel array of cells to permit battery charging, and wherein the plurality of second switches (Sb) configure the cells of the battery as a series array of cells that are directly connected in series with a load.

5. The apparatus of claim 4 wherein the charging means comprises a plurality of distributed power supplies respectively coupled to the plurality of sub-modules for reducing current required to charge the battery cells.

6. The apparatus of claim 4 wherein the non-aqueous battery comprises a lithium ion battery.

7. The apparatus of claim 4 wherein the charging means comprises:
   a plurality of second switches for connecting the respective battery cells of each of the plurality of sub-modules in series;
   a DC to DC power supply having first and second terminals coupled to the battery cells of each of the sub-modules;
   a plurality of third switches respectively coupled between the plurality of battery cells of each sub-module and the first terminal the respective DC to DC power supply;
   a fourth switch coupled between the respective sub-modules; and a fifth switch respectively coupled between the second terminal of each respective DC to DC power supply and the respective sub-module.

8. Non-aqueous battery charging apparatus comprising:

a non-aqueous battery comprising a plurality of sub-modules each containing a plurality of battery cells; and a charge control circuit that comprises:

charging means for charging each of the cells of the plurality of sub-modules of the non-aqueous battery; and cell bypass means for bypassing battery cells that are faulty and for reconfiguring the cells of the battery from a series array of cells to a parallel array of cells to permit battery charging, a second non-aqueous battery comprising a plurality of sub-modules each containing a plurality of battery cells, and wherein the respective batteries are selectively coupled to a load; and a second charge control circuit that comprises:

charging means for charging each of the cells of the plurality of sub-modules of the second non-aqueous battery; and cell bypass means for bypassing battery cells that are faulty and for reconfiguring the second battery from a series array of cells to a parallel array of cells to permit battery charging; and a cross strap switch coupled between the respective charge control circuits;

and wherein the first and second charge control circuits cooperate to sequentially charge the respective batteries and wherein the cross strap switch is switched to ensure that the satellite electrical bus is always supported by one battery during battery recharging.

* * * * *